United States Patent [19]

Neef et al.

[11] Patent Number: 4,735,421

[45] Date of Patent: Apr. 5, 1988

[54] SEALING APPARATUS UTILIZING A CONFORMABLE MEMBER

[75] Inventors: William S. Neef; Donald R. Lambert, both of Livermore, Calif.

[73] Assignee: The United States of America as represented by the United States Department of Energy, Washington, D.C.

[21] Appl. No.: 406,827

[22] Filed: Aug. 10, 1982

[51] Int. Cl.⁴ .............................................. F46J 15/46
[52] U.S. Cl. .......................................... 277/1; 277/34; 277/226; 277/DIG. 7; 376/203
[58] Field of Search .................... 277/34, 34.3, 34.6, 277/226, 1, DIG. 7; 376/203–205

[56] References Cited

U.S. PATENT DOCUMENTS

| | | | |
|---|---|---|---|
| 1,425,979 | 8/1922 | Kingsbury | 277/34 X |
| 1,942,366 | 1/1934 | Seamark | 277/34 X |
| 2,306,160 | 12/1942 | Freyssinet | 277/34 |
| 3,178,779 | 4/1965 | Clark et al. | 277/34 X |
| 3,891,223 | 6/1975 | Sonnen | 277/DIG. 7 |
| 4,065,137 | 12/1977 | Rueggeberg et al. | 277/34 |
| 4,118,042 | 10/1978 | Booth | 277/226 |

FOREIGN PATENT DOCUMENTS

| | | | |
|---|---|---|---|
| 1391923 | 2/1965 | France | 277/34.3 |
| 1425462 | 12/1965 | France | 277/34 |
| 988435 | 4/1965 | United Kingdom | 277/34 |
| 1049947 | 11/1966 | United Kingdom | 277/DIG. 7 |
| 2047356A | 11/1980 | United Kingdom | 277/34.3 |
| 773354 | 10/1980 | U.S.S.R. | 277/34.3 |

Primary Examiner—Robert S. Ward
Attorney, Agent, or Firm—L. E. Carnahan; Roger S. Gaither; Judson R. Hightower

[57] ABSTRACT

Sealing apparatus and method, comprising first and second surfaces or membranes, at least one of which surfaces is deformable, placed in proximity to one another. Urging means cause these surfaces to contact one another in a manner such that the deformable surface "deforms" to conform to the geometry of the other surface, thereby creating a seal. The seal is capable of undergoing multiple cycles of sealing and unsealing.

14 Claims, 6 Drawing Sheets

SEALING APPARATUS UTILIZING A CONFORMABLE MEMBER

FIELD OF THE INVENTION

The United States Government has rights in this invention pursuant to Contract No. W-7405-ENG-48 between the U.S. Department of Energy and the University of California, for the operation of Lawrence Livermore National Laboratory.

This invention relates generally to seals, more specifically to vacuum and load balancing seals, and particularly to vacuum seals for use between the modular segments of the central section of the tandem mirror reactor.

BACKGROUND OF THE INVENTION

All fusion reactors, whether tandem mirror, tokamak, or alternate concept, will be surrounded by blankets, whose principal function is to extract useful energy from the reactor. The "first wall" is the most interior surface of the blanket, and is that part of the blanket actually facing the fusion plasma. The first wall degrades due to the hostile environment, hence the blanket requires frequent service. For the well known tandem mirror reactor, the main chamber ("central cell") for housing the fusion reaction is comprised of a series of independent annular blanket modules which form a cylinder. To maintain the vacuum inside the central cell, an effective seal is necessary for mating the blanket modules in the desired series array.

First wall and blanket structure service and replacement require the reactor to be shut down. In view of the huge capital costs, down time is exceedingly expensive. To facilitate service, the fusion blanket is divided into modular annular-shaped segments for easy handling. The division plane(s) between modules are potential leakage paths for gas to enter and quench the reacting plasma housed inside the blanket. The many proposed blanket concepts address this blanket seal problem in different ways.

In one proposal, designers prefer remotely welded joints which must then be cut for disassembly by remote operator tools. High radiation environment due to structure activation makes remote operations a necessity, even at the outside of the shield which protects the magnets. The "shield" is the outer most region of the blanket, and is placed before the superconducting solenoid magnets to minimize irradiation of the magnets.

A second proposal suggests bolted joints with metal seals. A suitable arrangement according to this approach would include annular flanges mounted on the outside of the ends of each individual cell. Holes would be drilled through the flanges in a direction parallel to the centerline of the cell. The holes would be positioned opposite one another, thus permitting the insertion of bolts, to which would be attached nuts on the other end of the bolt. Before inserting the bolts, a malleable annular metal seal would be placed between the cell-to-cell interface surface (i.e., the division plane between each cell), selected so the metal would deform into the cell face as the bolts were tightened, thereby forming a bolted joint providing the desired seal. The disadvantage with this approach is that a new mealleable metal seal would have to fabricated each time the seal was broken by removal of the bolts.

A third approach is to use metal seals of the knife-edge type or metal "o"-rings or other similar devices which are forced closed against each other. More than one seal can be employed with differential pumping between the seals. However, the most serious disadvantage of this design is the problem of remaking a seal after one use. Overlapping seal indentations are seldom successful in forming the vacuum seal desired. Therefore, with each servicing of a modular segment of the blanket, a new seal would have to be fabricated.

The pressure in pounds per square inch (psi) is often quite high at the contact inferface of the seating apparatus or pressure cushion surfaces joined by bolts, knife-edge seals or metal o-rings. In order to obtain the sealing quality required for the "hard" vacuum (on the order of $10^{-6}$ torr) of the tandem mirror magnetic fusion reactor, the compression pressure on the contact interface surfaces for a removable reusable seal will preferably not exceed the elastic deformation limit of the seal material, because plastic deformation might destroy the ability to use the seal again. Bolts, knife-edge seals and metal o-rings work on the principle that the surfaces actually forming the seal have a very high psi compression pressure at the contact interface.

For example, the knife-edge seal typically consists of a "soft" metal such as copper, against which is pressed a "hard" metal such as stainless steel formed to have a knife-edge shape at the point of contact between the soft and hard metal. The hard knife-edge cuts into the soft metal to form the seal. The seal is formed at the small cross-sectional area where the knife-edge and "soft" metal are in contact. The result is that molecules outside the vacuum have an undesirably short distance across which to travel to reach the vacuum (i.e., the seal width, which in the case of an annular seal would be the seal's outside diameter minus the inside diameter).

Problems and shortcomings exist with current technologies directed to forming seals, as mentioned above. The knife-edge type or metal "o"-ring type can be used only once before the seal has to be replaced. The large diameter bellows have the pressurization and squirming problems. Therefore, an improved apparatus and method must be devised in order to obtain the repeatability of use and high quality vacuum seal required in high vacuum environments such as that found in a fusion reactor.

OBJECTS AND SUMMARY OF THE INVENTION

Accordingly, in order to resolve the above and other problems and shortcomings of the current technology, it is a general object of this invention to provide apparatus and method for providing a seal between two adjacent structures.

Another object of this invention is to provide a seal which is reusable.

Another object of this invention is to provide a seal between the modular blanket segments of the fusion blanket in fusion reactors, adaptable to incorporate neutron shielding elements.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

In summary, this invention achieves the above and other objects, and resolves the aforementioned problems and shortcomings of the current technology, by providing an improved sealing apparatus and method. According to this invention, at least two surfaces, at least one of which is comprised of a deformable material, are placed in proximity to one another. The deformable surface or membrane is mounted on a housing to enclose a chamber. Urging means are then used to cause the first and second surfaces to come into contact so the deformable material "deforms" to conform to the geometry of the other surface, thereby forming a seal. The seal is capable of undergoing multiple cycles of sealing and unsealing.

To further summarize this invention, various structural modifications are provided to make the invention particularly well suited for specific applications. A first variation provides for using the invention as a means for transferring or balancing loads. A second variation provides strengthening and movable internal structure for the housing, including: (a) a stiffener with holes, to which stiffener is attached the deformable means, in spaced apart relation with the stiffener to define a hollow envelope between the stiffener and deformable means, with the envelope and holes in fluid communication with the chamber, permitting the working fluid to outwardly deform the deformable member; (b) support means to which the stiffener is attached; (c) movable annular sealing means such as a rolling cuff attached at one end to the support means and at the other end to the inside of the housing, which rolling cuff permits the stiffener and support to move vertically with respect to the housing; and (d) a plurality of vanes attached to the stiffener, the housing, or both, adaptable to serve as neutron absorbers, guiding piston(s), and heat transfer means. A third variation provides for the invention to be configured in an annular shape. A fourth variation provides for the load cushion apparatus and annular sealing apparatus to be used together, such as in balancing loads, and providing seals between the annular cells of the tandem mirror magnetic fusion reactor.

BRIEF DESCRIPTION OF THE DRAWINGS

The accompanying drawings, which are incorporated and form a part of the specification, illustrate various embodiments of the invention and, together with the description, serve to explain the principles of the invention. In the drawings:

FIG. 8 is the top portion of a sealing apparatus for an application similar to that of FIG. 7, modified to include a stiffener, support, rolling cuff and guiding vane functioning as a piston to give the sealing apparatus more stiffness and greater mobility.

FIG. 9 is the apparatus according to FIG. 8 shown in cross-section and in the retracted position before formation of the seal created by moving the sealing apparatus together as illustrated in FIG. 8.

FIG. 10 is a side view of a configuration of the sealing apparatus of FIG. 8 adapted for several cells of a fusion reactor, and including a side view of the sealing apparatus of FIG. 2 used as a pressure cushion between cells of the fusion reactor.

FIG. 11 is a cross-section taken along line 11—11 of FIG. 10 showing the annular sealing apparatus and circular pressure cushion.

FIG. 12 shows the cells of FIG. 10 with the sealing apparatus and pressure cushions disengaged, and with one cell elevated to indicate a removal cycle of one of the cells.

DETAILED DESCRIPTION OF A PREFERRED EMBODIMENT

Figure 1:
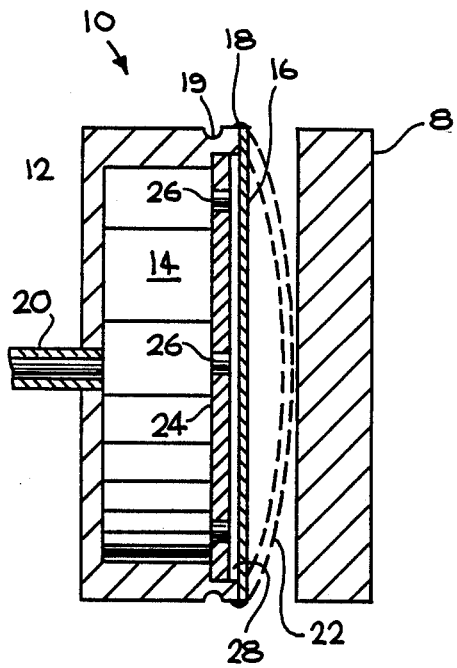
FIG. 1 is a cross-section of the seal actuation concept according to this invention.

FIG. 1 shows a preferred arrangement according to a simplified version of the present invention. Sealing apparatus 10 comprises housing 12 having a chamber 14. A deformable means such as membrane or member 16 is firmly attached to one side of housing 12 to enclose chamber 14. In the preferred embodiment, membrane 16 would be constructed of any suitable deformable material such as a metal or metallic compounds, elastomeric compounds, or plastic compounds, attached by attaching means such as welds 18. Notch 19 is provided in housing 12 next to welds 18 for reasons having to do with welding techniques rather than for reasons dealing with a preferred embodiment of this invention. If some other means than welds were used to attach membrane 16, then notch 19 would not be required. Wall 8 indicates a rigid surface toward which membrane 16 would move in an attempt to form a seal at the wall-membrane interface.

Conduit or tube 20 penetrates housing 12 and is in fluid communication with chamber 14. Conduit 20 at its outside end is attached, in this preferred embodiment, to a fluid compression means such as a hydraulic system or vacuum pumping system. When chamber 14 is pressurized during operation of the sealing apparatus, membrane 16 will, with sufficient pressure behind it, expand or deform to a position generally indicated by dotted lines 22. Obviously if too much pressure builds up in chamber 14 it could eventually lead to failure of membrane 16. When chamber 14 houses a vacuum, membrane 16 would move inward into the chamber 14. To stop movement of membrane 16 inward, the optional stiffener 24 having holes 26 is fixed to housing 12 inside chamber 14 and spaced apart by a thin envelope or hollow space 28. Holes 26 provide fluid communication between envelope 28 and chamber 14. If desired, the holes 26 could be formed by merely cutting apertures in stiffener 24.

Figure 2:
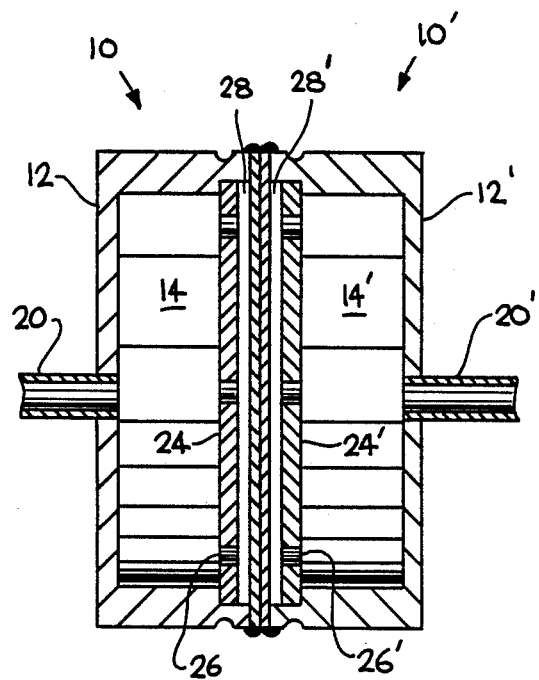
FIG. 2 is a cross-section wherein two of the sealing apparatus according to FIG. 1 are placed into contact in mirror image arrangement with one another.

FIG. 2 shows two sealing apparatus of the FIG. 1 type indicated at 10 and 10' and arranged in mirror image relation to each other, with membranes 16 and 16' facing each other and in contact. Chambers 14 and 14' are pressurized through conduits 20 and 20', preferably with equal pressures in order to minimize distortion of membranes 16 and 16'. As in FIG. 1, stiffeners 24 and 24' are optional. However, to prevent possible inward plastic deformation of membranes 16 and 16', it would be preferable to include stiffeners 24 and 24'.

Figure 3:
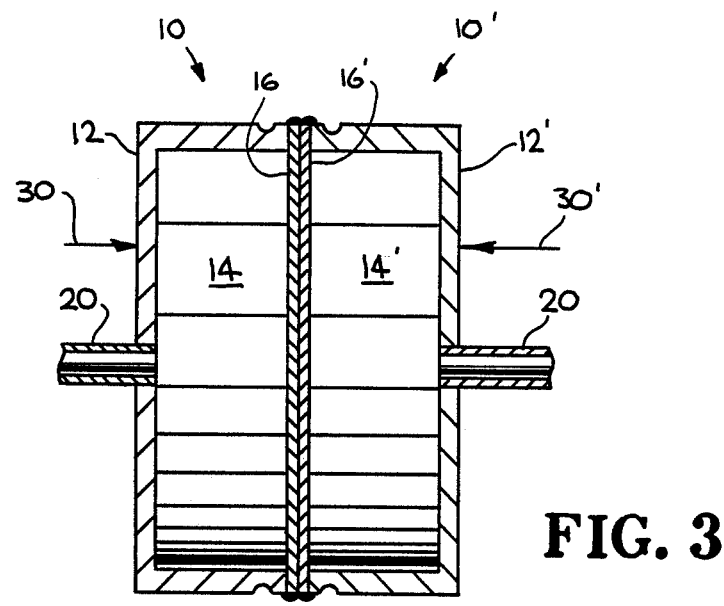
FIG. 3 shows the sealing apparatus of FIG. 2, but without stiffener means, used to balance or transfer a load between the two sealing apparatus.

FIG. 3 shows application of the sealing apparatus 10 of FIG. 1, but without stiffener 24, in cooperation with a similar sealing apparatus 10' for service as a load-bearing or load-transferring structure, for loads indicated at arrows 30 and 30'.

Figure 4:
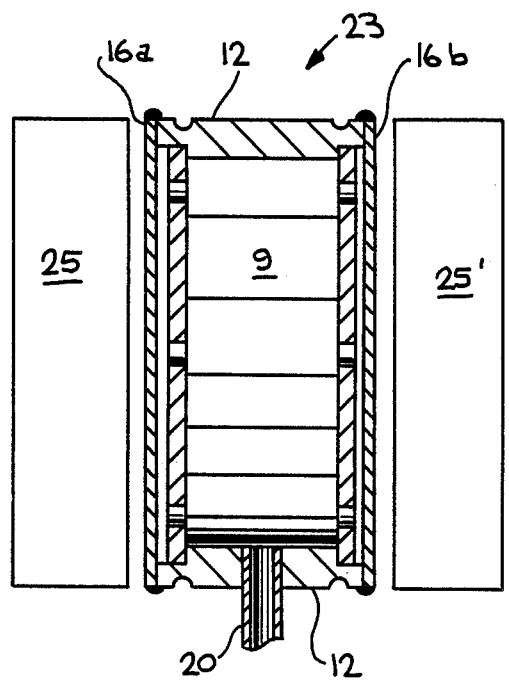
FIG. 4 is a side view of the apparatus according to this invention, adapted to have deformable members on opposing surfaces which expand into contact with two adjacent structures to form seals.

FIG. 4 shows another possible arrangement of the sealing apparatus according to this invention. This arrangement calls for membrane 16a and membrane 16b to be placed on opposite sides of housing 12. The sealing apparatus 23 thus created is then placed between two structures, 25 and 25', each of which is to be used in forming a seal. Thus placed, chamber 9 would be pressurized through conduit 20, causing membranes 16a and 16b to expand outwardly toward the adjacent structures 25 and 25', coming into contact with them to thereby complete the seal.

Figure 5:
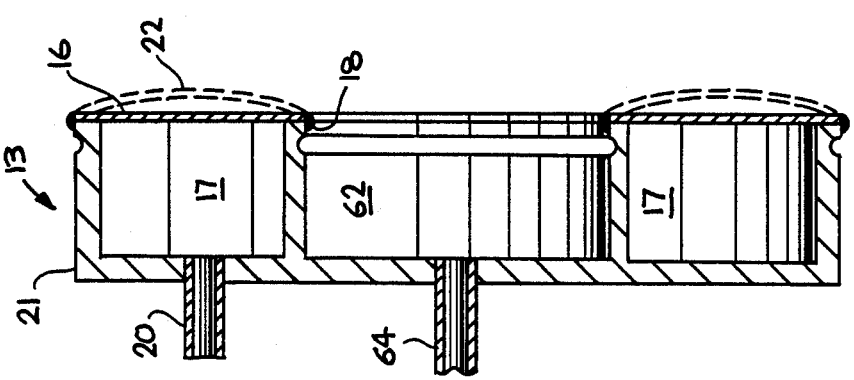
FIG. 5 is the side view of another embodiment of the invention constructed to have an annular shape, and surrounding and enclosing an interior chamber having a circular cross-section.

FIG. 5 through FIG. 12 show construction of a sealing apparatus 13 formed by shaping the apparatus 10 of FIG. 2 into an annular housing 21 having an annular chamber 17 surrounding an interior chamber 62. FIG. 5 shows the annular shape of sealing apparatus 13, enclosing and encircling an interior chamber 62.

Figure 6:
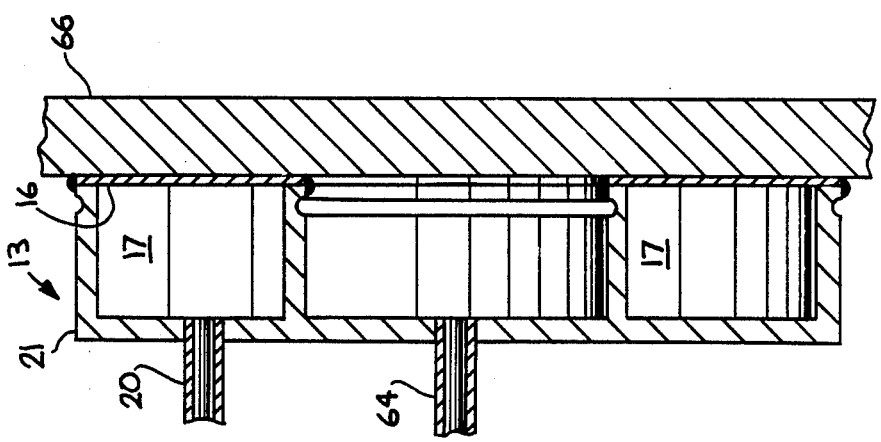
FIG. 6 shows the application of the apparatus of FIG. 5 to form a seal against a rigid structure.

FIG. 6 shows the apparatus of FIG. 5 placed to form a seal against wall 66 or some other rigid surface as one application of the sealing apparatus 13.

Figure 7:
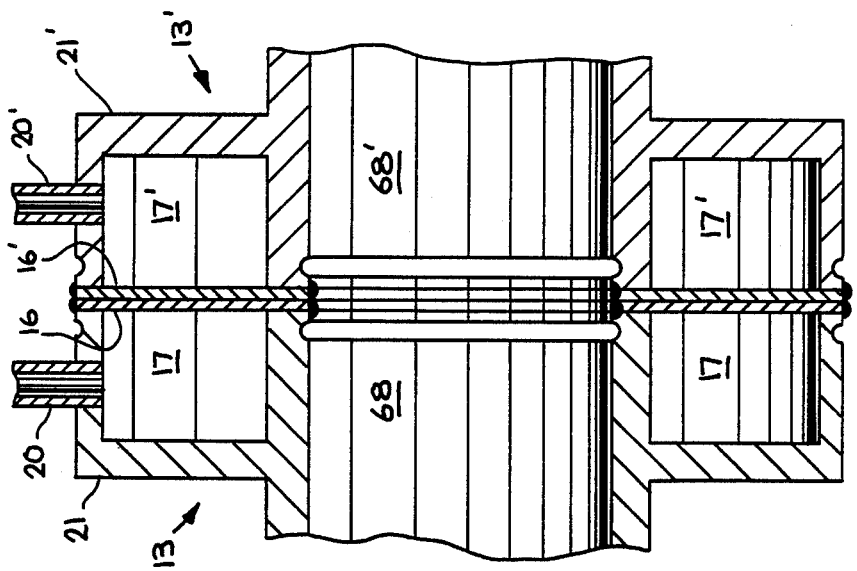
FIG. 7 shows two sealing apparatus in mirror image arrangement with one another.

FIG. 7 shows the sealing apparatus 13 in mirror image relation with sealing apparatus 13' having the same construction as sealing apparatus 13. This application is for joining together pipes 68 and 68' or some other conduit of a pressurized or evacuated system. Once again, the seal is formed at the interface of membrane 16 and 16'.

Figure 8:
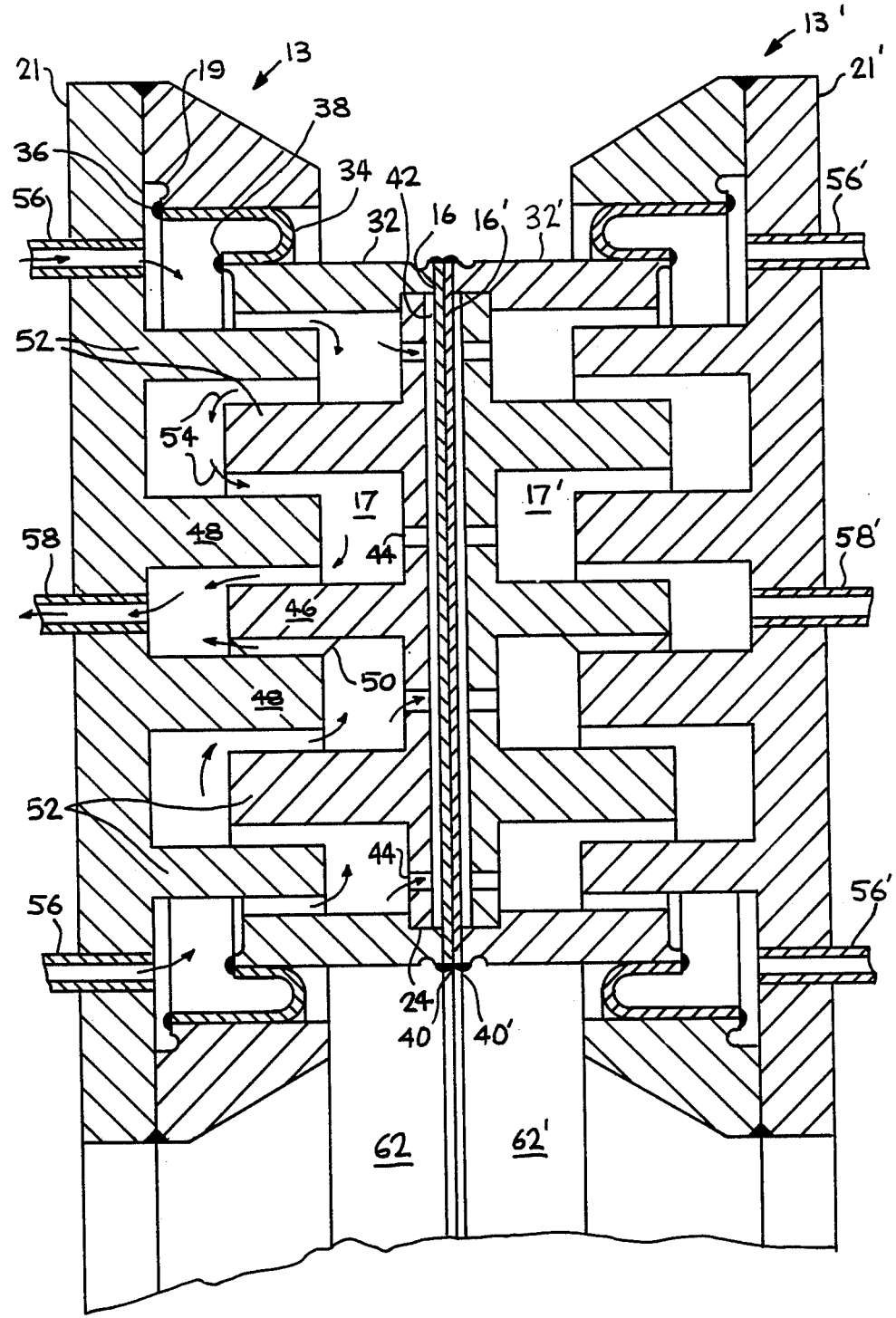
FIGS. 8 through 12 particularly emphasize the preferred embodiments of this invention.
Figure 9:
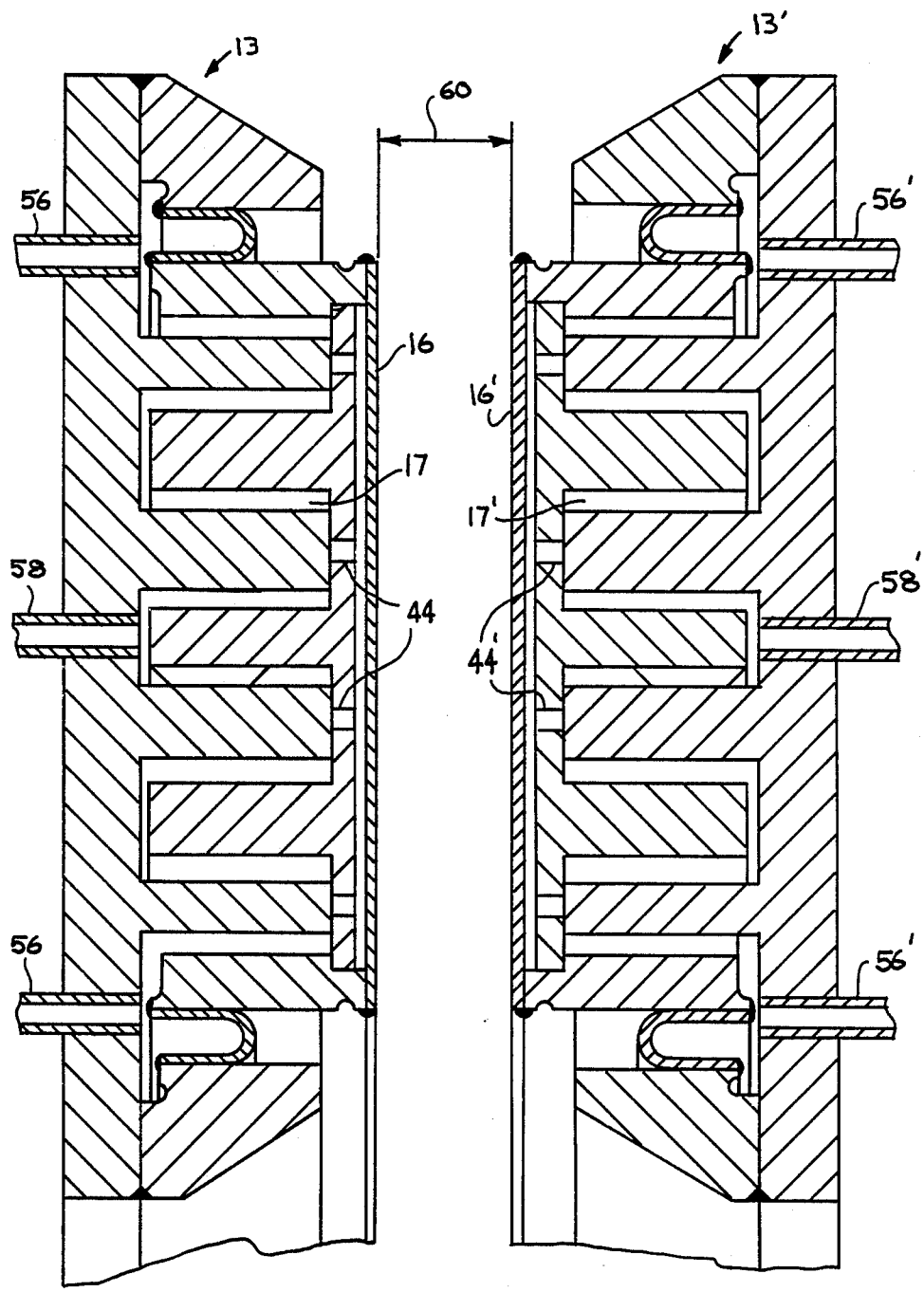

FIG. 8 and FIG. 9 show respectively the closed and open position of the upper half of an annular sealing apparatus.

FIG. 8 is a complex modification to the sealing apparatus especially suitable for use with heavy loads, high pressure differentials, and presence of various types of atomic and electromagnetic energy. In FIG. 8, housing 21 and 21' of sealing apparatus 13 and 13' are adapted so chambers 17 and 17' can accept a support 32 and 32'. For purposes of clarity only one sealing apparatus (13) is described, hereafter, in detail, the other being a mirror image. Movable guiding means such as rolling cuff is attached to the interior of housing 12 at joint 36 and to the outside edge of support 32 at joint 38. As mentioned previously, the notches 19 are provided when joints 36 and 38 are created with welds, which would be the preferred method for this invention. Membrane 16 is attached to the outside edge of support 32 at joint 40, preferably by a weld. An optional stiffener means such as stiffener 24 can be attached to the inside of support 32, slightly spaced apart from membrane 16 to provide an empty envelope or space 42. Tubes or holes 44 penetrate stiffener 24 so envelope 42 is in fluid communication with chamber 17.

If desired, one or more vanes can also be adapted to serve as a piston to guide movement of the seal. For example, a piston 46 can be mounted on the interior of stiffener 24, preferably in the center of stiffener 24. At least one piston guide vane 48 is mounted on the inside wall of housing 21 and adapted to receive and guide piston 46. Spline 50 is machined into piston 46, toward the free end of piston 46. The piston 46 and spline 50 are fitted into sliding contact with piston guide vanes 48. Spline 50 is required in order to permit circulation of the working fluid which operates sealing apparatus 13. Rolling cuff 34, stiffener 24, piston 46 and spline 50 provide guiding means for support 32 so support 32 is kept in the same plane during operation of sealing apparatus 13 and 13'.

Additional vane and piston arrangements indicated at 52 can be mounted on the inside surfaces of both stiffener 24 and housing 21. This would be a desirable feature in an environment having some form of energy such as heat, various atomic particles, or electromagnetic radiation. For example, if sealing apparatus 13 were used in a fusion reactor, the vanes could be fabricated from neutron absorbing materials to prevent neutrons from escaping from the fusion reactor. In the process of absorbing neutrons, the vanes would become heated. Heat would also be transferred into vanes 52 from the thermal heat of the fusion reaction. A working fluid represented generally by arrows 54 would circulate through chamber 17 to provide heat transfer cooling to vane and piston arrangements 52 as well as the other structures in or contacting chamber 17. A plurality of inlet conduits 56 and 56' and outlet conduits 58 and 58' (only one shown), penetrating the wall of housing 21, provide the means for admitting, circulating and removing the working fluid which "drives" the sealing apparatus 13 and 13'.

FIG. 9 shows sealing apparatus 13 and 13' disengaged and separated by a gap 60. FIG. 8 discussed previously shows sealing apparatus 13 and 13' in contact at their respective membranes 16 and 16' to create the desired seal.

During operation of the FIG. 9 "open" apparatus to achieve the seal of the FIG. 8 "closed" apparatus, urging means such as the working fluid of a hydraulic or vacuum system enters through inlet conduit 56 into chamber 17. As the pressure exerted by the urging means increases, support 32 begins to gradually move vertically away from housing 21. Because of the dynamics of hydraulic flow and fluid flow, the pressure is uniform throughout chamber 17, holes 44 and envelope 42. As a result, the "open" seal shown in FIG. 8 gradually begins to "close", with membranes 16 and 16' moving toward each other to gradually close the gap 60. The guiding means comprised of piston 46, spline 50, and rolling cuff 34 serve to keep membranes 16 and 16' generally parallel to each other. The seal becomes "closed" when membranes 16 and 16' contact each other. As the pressure in chamber 17 and 17' increases, membranes 16 and 16' begin to deform into each other so that eventually all voids at the membrane 16-16' interface are filled. At this point, sealing apparatus 13 and 13' succeed in obtaining a tight seal. Any surface irregularities which might exist on the surface of membrane 16 and 16' would not hamper the effectiveness of the sealing apparatus because of the ability of membrane 16 and 16' to conform to surface irregularities found in each membrane.

Figure 10:
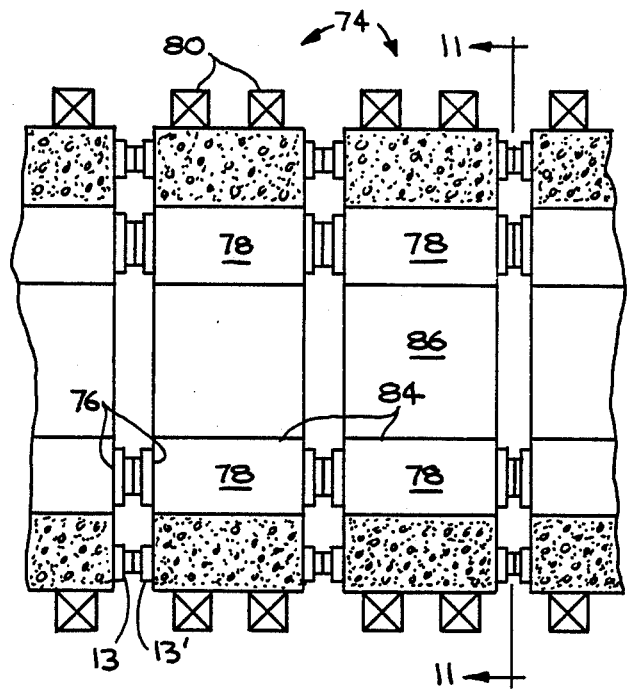
Figure 11:
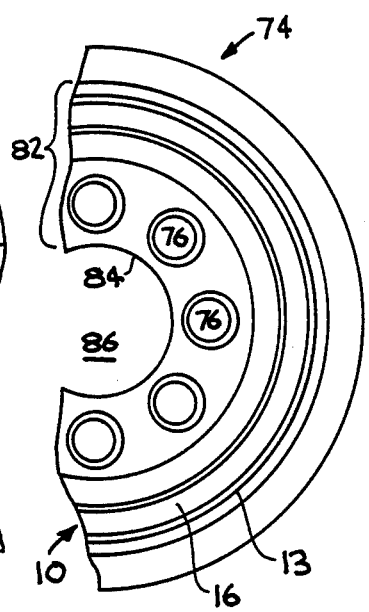
Figure 12:
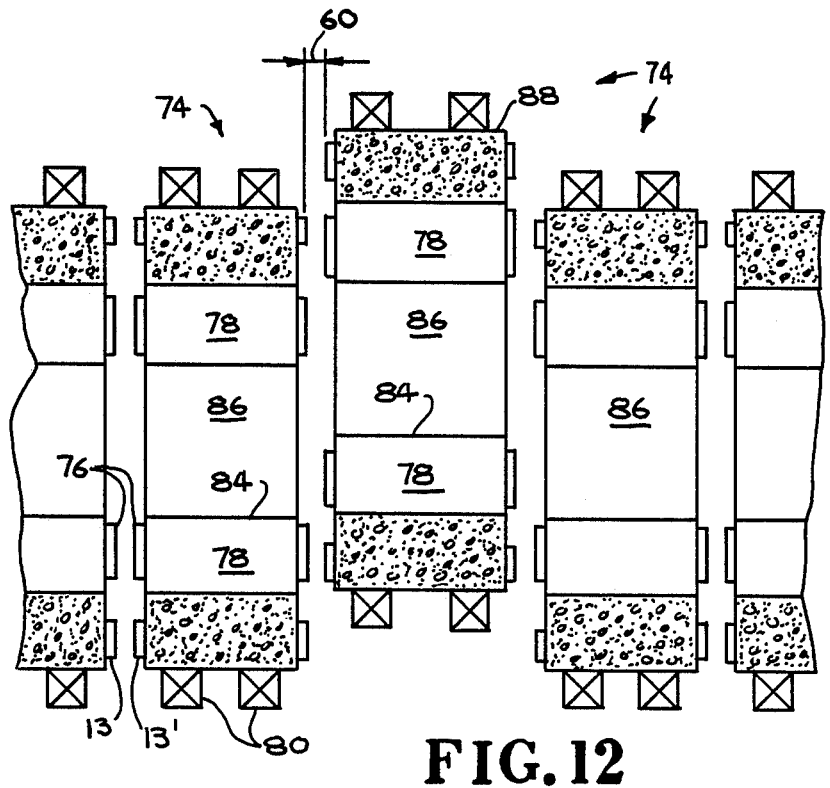

FIG. 10, FIG. 11 and FIG. 12 show one application of sealing apparatus for joining together a plurality of cells 74 of a fusion reactor. FIG. 10 shows the cells 74 in place with the sealing apparatus 13 and 13' engaged. Additionally, the construction of sealing apparatus 10 and 10' as shown in FIG. 2 provides service as a plurality of pressure cushions 76 capable of equalizing pressure loads transferred between cells 74. In the tandem mirror fusion reactor (TMR), pressure cushions 76 would be aligned with the pressure vessels 78 which are housed in the cells 74.

FIG. 11, which is a section taken along the line 11—11 of FIG. 10, shows cell 74 with sealing apparatus 13 in place. Also, the sealing apparatus used as pressure cushions 76 are shown. For purposes of clarity to show construction of a fusion reactor, also included are the plurality of magnet coils 80, blanket 82, inner first wall 84 of blanket 82, and plasma chamber 86. FIG. 12 shows the cells 74 of FIG. 10 separated by gap 60 distance, with the elevated cell 88 representing the anticipated removal operation of any cell 74.

Design dimensions for FIGS. 10, 11 and 12 have been approximated for the preferred annular sealing apparatus and preferred circular load cushions as applied to the tandem mirror magnetic fusion reactor. Annular cells 74 have an inside diameter of approximately two (2) meters (m), and an outside diameter of approximately 7 m. Coils 80 have an outside diameter of approximately 7.5-8.0 m. Circular pressure cushions 76 will have contact faces (i.e., membrane 16 of FIGS. 8 and 11) with a diameter of approximately 0.3 m. Annular seals 13 and 13' will have a seal width (i.e., the seal's outside diameter minus the inside diameter) which is approximately 0.2 m wide, and an outside diameter of approximately 6 m. The seal width can be selected to be as large or small as desired, depending on such factors as how "hard" the vacuum pressure is, the amount of pressure at the contact interface of the seal, and the type of material used to fabricate the seal with a view toward the elastic and plastic limits of the selected material.

The larger the seal width at the seal interface, then the further the distance a molecule outside the vacuum must travel to reach the vacuum, thereby making it more difficult for the vacuum seal to be breached. In vacuum technology, the path traveled by an "invading" molecule is typically referred to as the "conductance path" or the "leak path". Particularly in the "hard" vacuum situation, it would be desirable to make the seal width as large as possible to force molecules to travel a longer distance from outside to inside the vacuum. Additionally, because of seal materials limitations, it would be preferable to be able to spread the high compression pressure over as large an area as desired, thereby decreasing the psi compression pressure on the seal width at the seal interface.

Another arrangement according to the invention would be to concentrically mount a plurality of sealing apparatus 13 and 13' on cells 74. A variation on this theme would include leaving spaces between the concentrically mounted sealing apparatus on the face of cell 74, and then providing tubing and vacuum pumping means (not shown) which would be in fluid communication with the spaces, thus permitting creation of a series of vacuum spaces separating the ambient atmosphere from the vacuum in the central core of the TMR. Such an arrangement is typically referred to as "differential pumping", and each evacuated space and the equipment pumping it is referred to as a "differential pumping station". This construction would permit creation and maintenance of a high pressure ratio of ambient-to-vacuum pressure. In the TMR, this pressure ratio will be approximately $1:10^9$, assuming the ambient pressure is one (1) atmosphere and the vacuum pressure in the center of the TMR is $10^{-6}$ torr.

The foregoing descriptions of embodiments of the invention have been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application, to thereby enable others skilled in the art to best utilize the invention in various embodiments and with various modifications as are suited to the particular use contemplated. It is intended that the scope of the invention be defined by the appended claims.

We claim:

1. Sealing apparatus comprising:
   (a) housing means having a closed end and an open end and defining a single chamber therein:
   (b) at least one deformable means forming a substantially flat surface, and attached to said open end of said housing means in a manner to close said chamber;
   (c) apertured means positioned adjacent to said deformable means and secured to said housing means adjacent to but spaced from said open end for preventing substantial movement of said deformable means into said chamber; and
   (d) urging means including fluid pressure supply means operatively connected to said chamber for pressurizing said chamber and for deforming said deformable means outwardly from said chamber into contact with an associated surface to form a seal therebetween.

2. The apparatus according to claim 1, wherein said deformable means is a membrane.

3. The apparatus according to claim 1, wherein said urging means comprises a fluid compression and expansion system.

4. Sealing apparatus comprising:
   (a) a housing;
   (b) at least one deformable means forming a substantially flat surface attached to said housing so as to form a closed chamber; and
   (c) urging means including fluid pressure supply means in fluid communication with said chamber for deforming said deformable means (outwardly from said chamber) so as to contact an associated surface forming a seal therebetween;
   (d) said urging means additionally including a mechanical drive system mechanically linked to said deformable means.

5. The apparatus according to claim 1, wherein the seal width of said deformable means is selected to be as wide as necessary to prevent exceeding the elastic limit of the material from which said deformable means is fabricated.

6. The apparatus according to claim 1, wherein said apertured means comprises a stiffener means attached to said housing means in spaced relation from said open end of said housing means, inside said chamber and behind said deformable means, defining a hollow envelope between said stiffener means and said deformable means, said stiffener means being provided with fluid passageways so said envelope and said chamber are in fluid communication.

7. The apparatus according to claim 1, wherein two sealing apparatus are placed in mirror image arrangement, with said deformable means of each contacting one another to form a seal when urged together.

8. The apparatus according to claim 1, wherein said sealing apparatus has an annular shape.

9. Sealing apparatus having an annular shape comprising:
(a) housing means defining a chamber;
(b) at least one deformable means forming a substantially flat surface and attached to said housing means in a manner to close said chamber;
(c) apertured means positioned adjacent to said deformable means and secured to said housing means for preventing substantial movement of said deformable means into said chamber;
(d) urging means including fluid pressure supply means operatively connected to said chamber for deforming said deformable means outwardly from said chamber into contact with an associated surface to form a seal therebetween; and
(e) a movable support means connected by guiding means to said housing means, said movable support means being attached to said deformable means.

10. The apparatus according to claim 9 wherein at least one stiffener means is attached behind said deformable means.

11. Apparatus according to claim 9, wherein said guiding means includes annular rolling cuff means connecting said support means to said housing means, and piston means mounted in sliding relation with piston guide means attached to said housing means.

12. An apparatus for sealing a pressurized chamber which comprises:
(a) a first member comprised of a deformable material;
(b) a second member aligned substantially parallel to and in contact with the first member, and constructed of a deformable material;
(c) a first housing having an open end secured to said first member and defining at least a first chamber disposed behind the first member;
(d) a second housing having an open end secured to said second member and defining at least a second chamber disposed behind the second member;
(e) first and second apertured means positioned in said first and second chambers and secured to said first and second housings so as to divide each of said first and second chambers into two sections, and located adjacent to but spaced from said first and second members of deformable material; and
(f) pressurizing means in fluid communication with the first and second chambers, capable of pressurizing the two sections of said chambers to cause the first and second members to deform securely to each other to form a tight seal therebetween.

13. Method for balancing or transferring loads between two structures, comprising the steps of:
(a) providing a housing having a chamber therein;
(b) positioning at least two surfaces, at least one of which is deformable and secured to the housing, into contact with each other;
(c) providing apertured stiffener means within the chamber and secured to the housing so as to be adjacent to one of said deformable surfaces and on a side opposite said other surface;
(d) urging said surfaces into contact with each other and deforming at least one said deformable surface into said other surface to form a seal therebetween; and
(e) placing a load on at least one of the structures to which at least one deformable surface is affixed, causing the load between the structures to be transferred or balanced as desired at the contact interface formed between said two surfaces.

14. The apparatus according to claim 7, wherein said two sealing apparatus, when contacting one another, are constructed so as to provide for transferring and bearing at least one load placed on at least one sealing apparatus.

* * * * *